(12) United States Patent
van Leeuwen et al.

(10) Patent No.: US 7,381,338 B2
(45) Date of Patent: Jun. 3, 2008

(54) BALLAST WATER TREATMENT SYSTEM AND METHOD WITHOUT OFF-GAS

(75) Inventors: Johannes van Leeuwen, County of Story, IA (US); Michael D. Jennings, Ellicott City, MD (US); Richard A. Mueller, Olmsted Falls, OH (US); Jack H. Robinson, Clifton, VA (US)

(73) Assignee: Nutech 03, Inc., Arlington, VA (US)

( * ) Notice: Subject to any disclaimer, the term of this patent is extended or adjusted under 35 U.S.C. 154(b) by 477 days.

(21) Appl. No.: 11/246,235

(22) Filed: Oct. 11, 2005

(65) Prior Publication Data

US 2006/0027507 A1 Feb. 9, 2006

Related U.S. Application Data

(63) Continuation-in-part of application No. 11/039,819, filed on Jan. 24, 2005, now Pat. No. 7,273,562, which is a continuation-in-part of application No. 10/402,298, filed on Mar. 31, 2003, now Pat. No. 6,869,540.

(60) Provisional application No. 60/372,806, filed on Apr. 17, 2002.

(51) Int. Cl.
*C02F 1/78* (2006.01)
*B63B 39/03* (2006.01)

(52) U.S. Cl. .................. 210/760; 210/242.1; 210/931; 114/125

(58) Field of Classification Search .............. 210/760, 210/764, 192, 199, 205, 242.1, 931; 422/28, 422/186.07
See application file for complete search history.

(56) References Cited

U.S. PATENT DOCUMENTS

| | | | |
|---|---|---|---|
| 3,937,662 A | | 2/1976 | Bartik |
| 4,314,519 A | * | 2/1982 | Yunoki et al. ............... 114/125 |
| 4,317,333 A | | 3/1982 | Webby |
| 4,364,516 A | | 12/1982 | Rhoades et al. |
| 4,619,763 A | | 10/1986 | O'Brien |
| 5,040,487 A | * | 8/1991 | Bollyky et al. ............. 119/234 |
| 5,218,988 A | | 6/1993 | McNamara et al. |
| 5,494,576 A | | 2/1996 | Hoppe et al. |
| 5,679,257 A | * | 10/1997 | Coate et al. ................. 210/695 |
| 5,785,067 A | | 7/1998 | Kosofsky |
| 5,803,982 A | | 9/1998 | Sosofsky et al. |

(Continued)

FOREIGN PATENT DOCUMENTS

JP  2004160437  6/2004

(Continued)

OTHER PUBLICATIONS

Maceky, Tagg and Parsons, Technologies for Ballast Water Mangement, International Cooperation on Marine Engineering Systems, New York, May 22-23, 2000.

(Continued)

*Primary Examiner*—Frank M. Lawrence
(74) *Attorney, Agent, or Firm*—Caesar, Rivise, Bernstein, Cohen & Pokotilow, Ltd.

(57) ABSTRACT

A method and system treat ballast-water with ozone without release of detrimental off-gas into the atmosphere.

20 Claims, 7 Drawing Sheets

U.S. PATENT DOCUMENTS

| | | | |
|---|---|---|---|
| 5,816,181 A | 10/1998 | Sherman, Jr. | |
| 5,863,128 A | 1/1999 | Mazzei | |
| 5,932,112 A | 8/1999 | Browning, Jr. | |
| 6,000,418 A | 12/1999 | Kern et al. | |
| 6,053,121 A | 4/2000 | Tamashima et al. | |
| 6,106,731 A * | 8/2000 | Hayes | 210/760 |
| 6,125,778 A * | 10/2000 | Rodden | 114/74 R |
| 6,165,371 A | 12/2000 | Allen | |
| 6,205,981 B1 | 3/2001 | Lorraine | |
| 6,231,769 B1 * | 5/2001 | Pean et al. | 210/760 |
| 6,402,965 B1 * | 6/2002 | Sullivan et al. | 210/748 |
| 6,432,304 B1 * | 8/2002 | Nguyen | 210/172.5 |
| 6,500,345 B2 | 12/2002 | Constantine et al. | |
| 6,516,738 B2 * | 2/2003 | Cannon | 114/125 |
| 6,613,232 B2 * | 9/2003 | Chesner et al. | 210/650 |
| 6,723,233 B1 * | 4/2004 | Barnes | 210/167.11 |
| 6,840,983 B2 | 1/2005 | McNulty | |
| 7,273,562 B2 * | 9/2007 | Robinson et al. | 210/760 |
| 2002/0088758 A1 | 7/2002 | Blumenschein et al. | |
| 2002/0162803 A1 | 11/2002 | Haney | |
| 2002/0191483 A1 | 12/2002 | Ohtsuki et al. | |
| 2003/0015481 A1 * | 1/2003 | Eidem | 210/760 |
| 2004/0055966 A1 * | 3/2004 | Nguyen et al. | 210/748 |
| 2004/0060876 A1 * | 4/2004 | Tipton | 210/748 |

FOREIGN PATENT DOCUMENTS

| | | | |
|---|---|---|---|
| WO | WO 00/20338 | * | 4/2000 |
| WO | PCT/US2005/045738 | | 8/2006 |

OTHER PUBLICATIONS

Oemcke, The Treatment of Ships' Ballast Water, EcoPorts Monograph Series No. 18, Section 9.5.5, Mar. 1999.

Oemcke and van Leeuwen, Potential of ozone for ballast water treatment, Ports Corporation Queensland, Section 1.1.3, Mar. 1998.

High Efficiency In-Line Pressureized Ozone Contacting with the GDT™ Process, http://www.mazzei.net/articles_publications/papers/GDTPaper4.pdf , Berlin, Germany, Apr. 22, 1997.

Oemcke, The Treatment of Ships' Ballast Water, Ecoports Monograph Series No. 18, Mar. 1999.

* cited by examiner

TABLE 1

| Species | LC50(95%C.I.)mg TRO/L as Br$_2$ | | | | | |
|---|---|---|---|---|---|---|
| | 0.5h | 1h | 2h | 3h | 4h | 5h |
| Americamysis bahia | >0.9 | >1.22 | 1.37 (1.29,1.45) | 0.62 | | |
| Atherinops affinis | >0.9 | 0.38 (0.31,0.47) | 0.31 | | | |
| Cyprinodon variegatus | >0.42 | 1.13 (1.13,1.13) | 0.44 (0.39,0.50) | 0.44 (0.24,0.85) | 0.35 | |
| Rhepoxinius abronius | >0.48 | >1.51 | 1.72 (0.76,3.89) | 1.37 (1.27,1.49) | 0.94 | |
| Leptocheirus plumulosus | >0.65 | >1.24 | >2.93 | >3.63 | >4.21 | >5.63 |

TABLE 2

| Species | LC95(95%C.I.)mg TRO/L as Br$_2$ | | | | | |
|---|---|---|---|---|---|---|
| | 0.5h | 1h | 2h | 3h | 4h | 5h |
| Americamysis bahia | >0.9 | >1.22 | 1.67 | 1.14 | | |
| Atherinops affinis | >0.9 | 1.15 | 0.59 | | | |
| Cyprinodon variegatus | >0.42 | >1.13 | 0.82 | 1.46 | 0.63 | |
| Rhepoxinius abronius | >0.48 | >1.51 | >2.46 | 2.66 | 2.9 | |
| Leptocheirus plumulosus | >0.65 | >1.24 | >2.93 | >3.63 | >4.21 | >5.63 |

TABLE 3

| Storage time (h) | 24-h LC50 | 48-h LC50 | 24-h LC95 | 48-h LC95 |
|---|---|---|---|---|
| 0 | 0.70 (0.63,0.78) | 0.47 (0.27,0.90) | 1.06 (1.06,1.06) | 1.03 (0.91,1.09) |
| 24 | 0.50 (0.47,0.54) | 0.43 (0.36,0.51) | 0.83 (0.83,0.83) | 0.82 (0.81,0.82) |
| 48 | 0.43 (0.38,0.48) | 0.32 (0.23,0.43) | 0.75 (0.74,0.76) | 0.74 (0.70,0.77) |

FIG. 9

BALLAST WATER TREATMENT SYSTEM AND METHOD WITHOUT OFF-GAS

This application in a continuation-in-part application of U.S. application Ser. No. 11/039,819, filed Jan. 24, 2005, now U.S. Pat. No. 7,273,562 which in turn is a continuation-in-part of U.S. application Ser. No. 10/402,298, filed Mar. 31, 2003, now U.S. Pat. No. 6,869,540, which claims the benefit of U.S. Provisional Application Ser. No. 60/372,806, filed Apr. 17, 2002, all the disclosures of which are incorporated herein by reference in their entirety.

This invention was made with government support under Contract No. NA04OAR awarded by the Nattonal Oceanic and Atmospheric Administration, Department of Commerce. The government has certain rights in the invention.

BACKGROUND OF THE INVENTION

The invention relates to a ballast water ozone injection method and system. More particularly, the invention relates to a system for injecting ozone to treat water during loading or discharge to or from the ballast tanks of a vessel or ship.

Ballast water weight is used by sea vessels to compensate for a lack of cargo weight to maintain stability when the ship cargo hold is empty or partially empty. For example in a typical transport operation, a vessel docks at a first port where it is loaded with a cargo that is transported to a second port where the cargo is unloaded. The vessel then returns to the first port where it is loaded with another cargo. Typically, the vessel travels empty from the second port back to the first port to pick up another cargo. The vessel is equipped with ballast tanks that can be filled with water to maintain the balance of the vessel when it travels empty. The ballast tank water is then discharged when cargo is loaded.

Ballast water contains species that are indigenous to the ballast tank filling location. These species are loaded into the ballast tanks along with the water. The vessel then transports ballast water to a cargo loading port where the species are discharged into the water environment along with the ballast water. The discharged species may be nonindigenous and deleterious to the discharge water environment. The nonindigenous species may cause damage to the water environment and replace benthic organisms and clear plankton communities that provide food and larvae for desirable resident native species.

In 1996, Congress passed the National Invasive Species Act (P. L. 104-332) ("NAIS") to stem the spread of nonindigenous organisms through ballast water discharge. The act reauthorized the Great Lakes ballast management program and expanded applicability to vessels with ballast tanks. The Act requires the Secretary of Transportation to develop national guidelines to prevent the spread of organisms and their introduction into U.S. waters via ballast water of commercial vessels. The National Aquatic Invasive Species Act and the Ballast Water Management Act and other pending or to be introduced legislation regulate the treatment of salt or fresh ballast water prior to its discharge and would require that all ballast water discharged within the territorial waters of the United States (i.e. within 200 miles of the Coast or in the Great Lakes) be treated so as to kill or remove all aquatic nuisance species (i.e. bacteria, viruses, larvae, phytoplankton and zooplankton).

The water loaded into ballast tanks is a complex composition of physical, chemical and biological entities. Further, the composition of the water varies considerably from port to port, particularly in terms of biological constituents. The complexity and variation of the water makes disinfectant treatment unpredictable. Various known methods and systems for treating water may not work for treating ballast water because of a resistant life form or unexpected chemical constituency or a proposed treatment itself may degrade a local ecosystem upon discharge.

Ozonation has been found to be a safe and effective disinfectant method and system to treat ballast water for discharge into destination water environments. Rodden U.S. Pat. No. 6,125,778 first suggested an ozone ballast water treatment that included sparging into ballast water tanks. However direct tank sparging may make ozonation disinfection expensive and ineffective as not all spaces in ballast tanks may be reached. Robinson et al. U.S. Pat. No. 6,869,540 (Robinson) has suggested an in-line treatment of loading and/or unloading ballast water. The Robinson method can comprise injecting ozone into a line of water loading into a sea faring vessel prior to charging the water into a ballast tank; charging the ozone injected water into the ballast tank; and adjusting a rate of injection of the ozone into the water and adjusting the rate of water loading into the vessel to provide a target biokill of species within the water.

Robinson ozonation achieves disinfection by a sequential and combined two mechanism effect—ozonation and bromination. Ozone directly kills species by oxidation. Additionally, a reaction between ozone and naturally occurring seawater bromides results in a disinfecting bromination through the formation of hypobromous ion and hypobromous acid. The effect of the ozonation and bromination disinfecting processes has been found to be synergistic in that the combined effect is an improvement over the effects of the separate disinfectant processes.

In-line ozonation of seawater during pumping intake or discharge is more effective and more economical than in-tank treatment. However, other concerns remain. For example, off-gas can be a concern with ozone usage and some of these systems require an ozone destroying off-gas destruction device at the system exhaust end. The cost of equipment for off-gas treatment of systems of the size of a sea vessel could be prohibitive.

There is a need for an uncomplicated and cost effective system and method for direct ozonation of intake/discharge ballast water.

BRIEF DESCRIPTION OF THE INVENTION

In accordance with the current invention, a correct dose of ozone into ballast water is provided that assures complete disinfect treatment of ballast water without deleterious off gas. A first aspect of the invention is a ballast-water treatment system without an off-gas destruction device; comprising: a salt water or fresh water sea faring vessel including at least one ballast tank and at least one conduit conveying water to or from an intake/outlet to the ballast tank; a regulator to divert a portion of the water from the conduit; an injector to provide an ozone injection rate into the portion of water; and a controller operatively connected to the regulator and the injector to adjust the diverted portion of water and an injection rate of the ozone into the portion to attain the target biokill while avoiding a release of detrimental gas into the atmosphere without an off-gas destruction device.

In another embodiment, the invention is a method of ozone treatment, comprising: determining a target biokill of species for water charging into a ballast tank of a sea faring vessel; determining an injection of ozone into the water to attain the target biokill without releasing an environmentally toxic off-gas into the atmosphere; regulating a diverted portion of the water prior to charging the water into the ballast tank; adjusting the regulating of the diverted portion of water and a rate of injection of ozone into the portion to attain the target biokill without release of an environmentally toxic off-gas; and injecting ozone at the determined rate into the regulated diverted portion to attain the target biokill when the portion is recombined into the water for charging to the ballast tank without releasing an environmentally toxic off-gas into the atmosphere.

DETAILED DESCRIPTION OF THE INVENTION

The invention relates to ozone ballast water treatment. Proposed NAIS amendments define "ballast water" as "any water (with its suspended matter) used to maintain the trim and stability of a vessel." In another definition, "ballast water" is A) water taken on board a vessel to control trim, list, draught, stability or stresses of a vessel including matter suspended in such water; and B) any water placed in a ballast tank during cleaning, maintenance or other operations." These definitions are incorporated into this specification as embodiments of treatable water.

In an embodiment of the invention, an inline gas injector such as a venturi is interposed to temporarily lower pressure of flowing ballast water by increasing the velocity of the water flow in a conduit. An interposed inline injector can create a lower pressure by increasing liquid velocity. A venturi is a preferred injector in an inline injection ballast water treatment.

In an embodiment, the invention relates to a ballast water treatment system for a vessel. The system can comprise an injector interposed in a water conduit with an inlet port adapted to receive the water, an injector port adapted to receive a treating gas and an outlet port adapted to expel the water. However, ballast water conduits that charge water to or discharge water from a ballast tank are large, typically on the order of about 18 inches in diameter. The cost of an injector such as a venturi for a conduit of this size is substantial. Further, installing such an injector into a main conduit will impact operational parameters of the vessel. An interposed injector will increase flow backpressure and require an increased ballast water pump capacity. Applicants' calculations indicate that an interposed venturi will increase a pumping time required to fill ballast tanks of some vessels by one or two hours (about 10%). Further, ballast water conduits may serve both to load ballast water and to discharge ballast water. An interposed injector may interfere with a reversed water flow, for example to discharge ballast water. These disadvantages can be overcome by a preferred embodiment of the invention wherein ozone is injected into a portion of ballast water in a line that bypasses a part of the main water conduit.

A further preferred embodiment of bypass line ozone injection is based on consideration of the physical and chemical nature of ozone in ballast water including the solubility of ozone in seawater and the relationship of the chemical reactions of the ozone to solubility.

Ozone ($O_3$) is an allotropic form of oxygen. It is an unstable blue gas with a pungent odor, a molecular weight of 48 g/mol and a density as a gas of 2.154 g/liter at 0° and 1 atm. It is approximately 13 times more soluble in water than is oxygen. Ozone is highly unstable and is a powerful oxidizing agent. It is non-persistent and has a very short half-life.

Typically, ozone is produced by passing oxygen, in some concentration, through a highly charged corona field, a technique known as "corona discharge". The corona may be produced by applying a very high electric potential (up to 20 kV) between two conductors that are separated by an insulating dielectric layer and a small air gap. Under these conditions, molecular oxygen ($O_2$) passing through the gap between the conductors experiences sufficient dissociation energy to partially dissociate. A certain fraction of the free oxygen radicals will associate with oxygen molecules to form $O_3$, according to the equilibrium reaction equation:

$$3O_2 + 69 \text{ kcal} \leftrightarrows 2O_3 \qquad (I)$$

The generation of ozone as represented by equation (I), is an equilibrium reaction. The reaction is endothermic to produce $O_3$, requiring energy, and is exothermic to produce $O_2$, giving up energy. Because of its equilibrium nature, actual conversion to ozone is relatively low, in the range of 2-14%, depending on the oxygen content of feed gas, the temperature of the reaction and properties of the ozone generator Other considerations in providing an effective ozone treatment method and system relate to the mechanism of gas treatment of ballast water. McNulty, U.S. Pat. No. 6,840,983 discloses a ballast water treatment system that comprises an injector interposed in a main water conduit with an inlet port adapted to receive the water, an injector port adapted to receive an oxygen stripping gas and an outlet port adapted to expel the water. McNulty injects an oxygen stripping gas that scavenges oxygen from the ballast water purported to cause suffocation of oxygen-dependent species. On the other hand, ozone is an oxidizing gas that has different and at least double disinfecting mechanisms. These mechanisms include rapid conversion of naturally occurring ballast water chemical constituents into products that are toxic to organisms as well as direct ozone destructive oxidation of organisms.

The following four equations (Von Gunten & Hoigné, 1994) describe the utilization of ozone in seawater assuming the only ozone demand is between ozone and dissolved bromide.

$$O_3 + Br^- \rightarrow OBr^- + O_2 \quad 160 \text{ M}^{-1} \text{ s}^{-1} \qquad (1)$$

$$OBr^- + O_3 \rightarrow 2O_2 + Br^- \quad 330 \text{ M}^{-1} \text{ s}^{-1} \qquad (2)$$

$$OBr^- + O_3 \rightarrow BrO_2^- + O_2 \quad 100 \text{ M}^{-1} \text{ s}^{-1} \qquad (3)$$

$$BrO_2^- + O_3 \rightarrow BrO_3^- > 10^5 \text{ M}^{-1} \text{ s}^{-1} \qquad (4)$$

Hypobromous ion (OBr—) is created in reaction (1). Most of the reaction (1) ion is then converted to hypobromous acid (HOBr) by addition of a hydrogen ion from water. The hypobromous ion and hypobromous acid formed are known as total residual oxidant (TRO). Only reaction (1) leads to the formation of TRO. The further reactions (2) to (4) undesirably remove both ozone and bromine products from the disinfectant process. A first goal of seawater ozonation is to convert as much ozone as possible to HOBr or OBr⁻. Therefore, maximizing reaction (1) and minimizing reactions (2)-(4) will maximize OBr⁻.

The reactions shown are of second order. The given reaction rate constants indicate the speed at which the reaction occurs as a function of the ozone concentration. To determine a relative rate between reactions (1) and (2), the rate constant of (2) is divided by that of (1). The rate of reaction (2) is approximately 2 times faster than reaction (1)—that is for equal concentrations of the reactants.

The above reaction rates are such that if the molar concentration ratio of Br— to OBr— drops below about 2.7, further ozone dosages do not produce more OBr— as the ozone consumption in reactions (2) and (3) will exceed reaction (1). The hypobromous ion forming reaction dominates when ozone is introduced into an excess of bromide. Typically about 70 mg/L of bromide is available in seawater. This provides enough bromide excess to minimize ozone losses at typical ozonation levels (1 to 5 mg/L of ozone) into a conduit of loading or unloading ballast water. However, a bypass line will present a lesser amount of water and a corresponding lesser amount of bromide available to be used up before dominance of the ozone and OBr⁻ dissipation reactions (2) to (4).

The available amount of bromide in bypass seawater needs to be taken into consideration when determining a flow rate or retention time for bypass ozonation. Retention time is a period for transport of ozone and water from a point of injection of the ozone to reinjection of bypass water and ozone into a main conduit. In an embodiment, a method and system are provided whereby dissipating ozone and OBr⁻ reactions are minimized while the synergistic disinfection by ozonation and bromination is maintained. According to an embodiment of the invention, a method and system are provided to minimize retention time. In this specification, retention time is a period of time from injection of ozone into water in a bypass to reinjection time of the bypass line seawater into the seawater of a main conduit or tank. An embodiment of the invention provides for reinjecting an ozone treated bypass water portion back into a "bromide rich" main conduit seawater to avoid substantial ozone and OBr⁻ consumption in $BrO_2^-$ and $BrO_3^-$ formation and oxygen reversion per reactions (2) to (4). "Retention time" is minimized.

In an embodiment, a 0.21 second retention time results in an acceptable 4.3% ozone loss. According to an embodiment of the invention, a method and system are provided wherein retention time is controlled at less than 5 seconds, desirably less than 0.25 seconds and preferably less than 0.21 seconds to minimize reactions (2) to (4).

Features of the invention will become apparent from the drawings and following detailed discussion, which by way of example without limitation, describe preferred embodiments of the invention.

Figure 1:
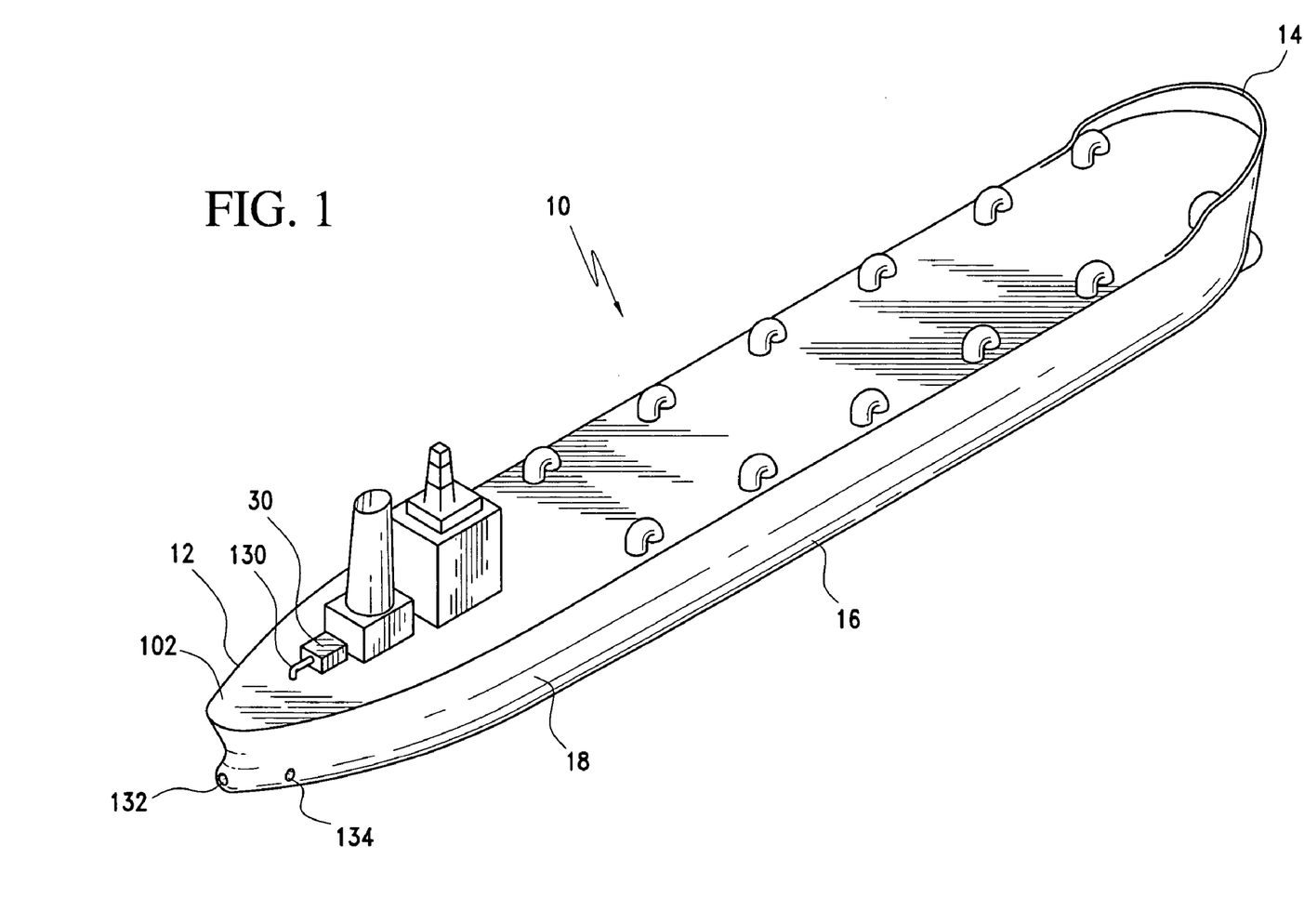
FIG. 1 is a schematic perspective view of a double hulled vessel and treatment system.
Figure 2:
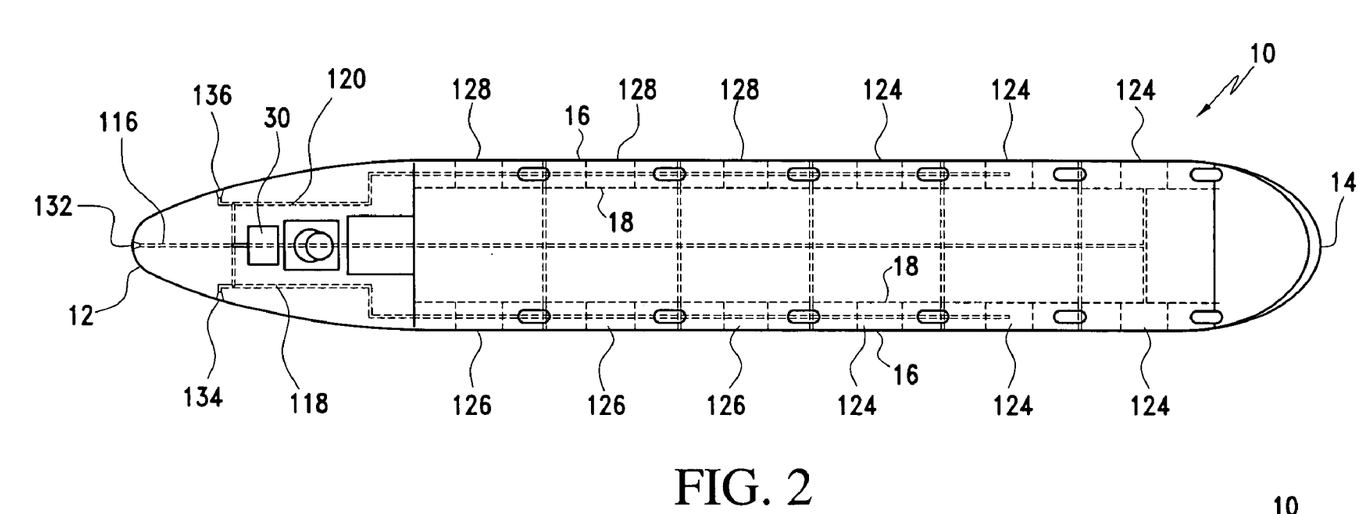
FIG. 2 is a schematic side view of the vessel and treatment system.
Figure 3:
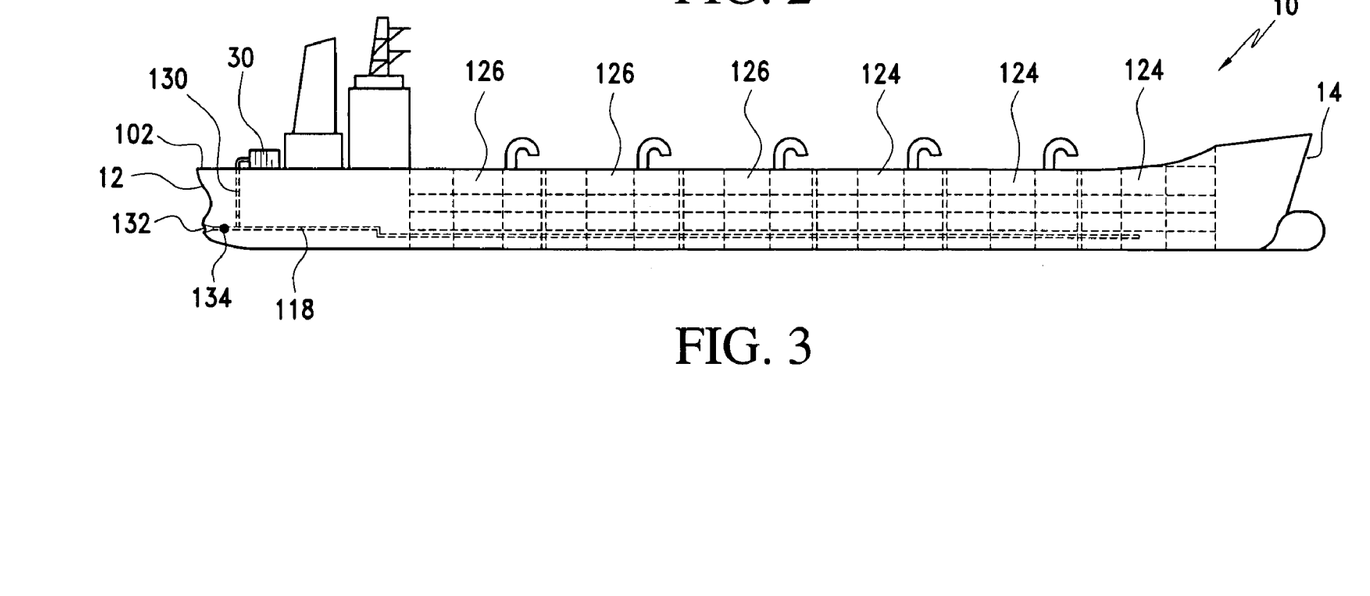
FIG. 3 is a schematic top view of the vessel and treatment system.

FIGS. 1 to 3 schematically show vessel 10 including stern 12, bow 14 and a double hull formed from outer hull 16 and inner hull 18. Vessel 10 is representative of the types of vessels encompassed within the invention and is a conventionally proportioned double-hulled oil tanker having cargo compartments within inner hull 18. However, the present invention can be applied to any sea faring ship or vessel that has ballast tanks or bilge water. The vessel 10 is typical of vessels that transport partly or fully refined or residual petroleum or other bulk liquid products such as seed oil.

Ozone generator 30 is illustrated located on vessel 10 aft deck 102 with main ozone feed line 130 shown as part of the ozone injection system of the invention. Generator 30 can be structured and can generate ozone according to known ozone generators such as described by Rodden U.S. Pat. Nos. 6,125,778; 6,139,809; and PCI-WEDECO (PCI-WEDECO Environmental Technologies, 1 Fairfield Crescent, West Caldwell, N.J. 07006) type SMO/SMA series generators and WEDECO Effizon® technology high concentration ozone production generators as examples. The disclosures of these patents are incorporated herein by reference in their entirety.

Ozonated gas is pumped through generator 30 and subsequently through line 130 for injection into water in respective ballast water intake/discharge conduits 116, 118 and 120 via respective connector lines in accordance with the FIG. 1 through 3 embodiment of the invention. Intake/discharge conduit 116 conveys water from stern intake/outlet sea chest 132 to forward battery 124 of ballast tanks. Intake/discharge conduit 118 conveys water from starboard intake/outlet sea chest 134 to a starboard battery 126 of ballast tanks. Intake/discharge conduit 120 conveys water from port intake/outlet sea chest 136 to a port battery 128 of ballast tanks.

Ballast water is loaded into the vessel 10 via the sea chests 132, 134, 136 and is then pumped to load respective ballast tank batteries 124, 126, 128 through the system of conduits 116, 118 and 120 shown. At a destination location, the process is reversed and water is pumped from tank batteries 124, 126, 128 through the respective conduits 116, 118, 120 for discharge through respective sea chests 132, 134, 136 to the sea. Or, discharge can be effected through another, separate conduit and sea chest system (not shown) from tank batteries 124, 126, 128. After injection with ozone, the water is conveyed by one of the main conduits 116, 118, 120 to respective tank batteries 124, 126, 128. As each main conduit 116, 118, 120 passes through each ballast tank 124, 126 or 128, a smaller footer pipe (not shown) can be taken off to provide a suction/discharge conduit. Valving for the footer pipe can be contained in a tunnel or cofferdam area, or actually placed in the tank itself, if space is an issue.

In FIGS. 2 and 3, conduit 118 delivers ozone treated water to each ballast tank of a starboard battery of tanks 126 and conduit 120 delivers ozone treated water to each ballast tank of a port battery of tanks 128. Water enters through respective sea chests 134 and 136 and is treated and charged into a tank of either the starboard battery 126 or the port battery 128 until each respective tank is sufficiently filled and balanced to compensate for off-loaded cargo. Water enters through stern sea chest 132, is treated with ozone and charged into a tank of forward battery 124 until each tank is filled to balance the vessel 10.

While the figures describe treating ballast water from sea chests 134 and 136, the invention applies to water either charging to a ballast tank or treatment of water being discharged from a ballast tank and to a fresh or salt water body such as a sea. An amount of ozone (in terms of a dosed proportion to the loading or discharging ballast water) is important to the proper operation of the ballast water treatment system. Typically, ozone is generated at a concentration of about 10-12% ozone/oxygen. This means, that about 9 lbs. of oxygen are dosed for every pound of ozone. If 3.5 mg ozone is dosed per liter of water then about 32 mg/L of accompanying oxygen is dosed. It has been found that if properly controlled according to the invention, then both the ozone and the oxygen will be fully soluble in the full ballast water intake or discharge stream without release to the atmosphere.

While the following is not binding, avoidance of deleterious atmospheric release may be explained as follows: Henry's law constant for oxygen indicates that the solubility of pure oxygen will be 49 mg/L at 1 atmosphere pressure in pure water at 15° C. The solubility of oxygen in seawater is about 40 mg/L. The solubility of pure ozone is 8 times as high as that of oxygen.

Pressure in ballast tanks typically varies between 1 and 3 atmospheres as a tank is filled. Gas solubilities are three times higher at 3 atmospheres as at 1 atmosphere. Typically seawater is saturated with oxygen at about 15° C. Hence prior to injection, the seawater already contains about 8 mg/L of oxygen. Controlling injection according to the invention, can provide an additional 32 mg/L of oxygen and all the ozone will be dissolved at 1 atmosphere. At three atmospheres, the invention provides an excess capacity for dissolving both oxygen and ozone.

Further, dissolving all the oxygen along with the ozone averts an equilibrium situation. Consuming ozone by chemical reactions in the seawater averts the release of ozone from solution when subsequently exposed to the atmosphere is avoided or minimized. Hence, averting equilibrium permits a nearly total transfer of ozone to water or seawater.

Figure 4:
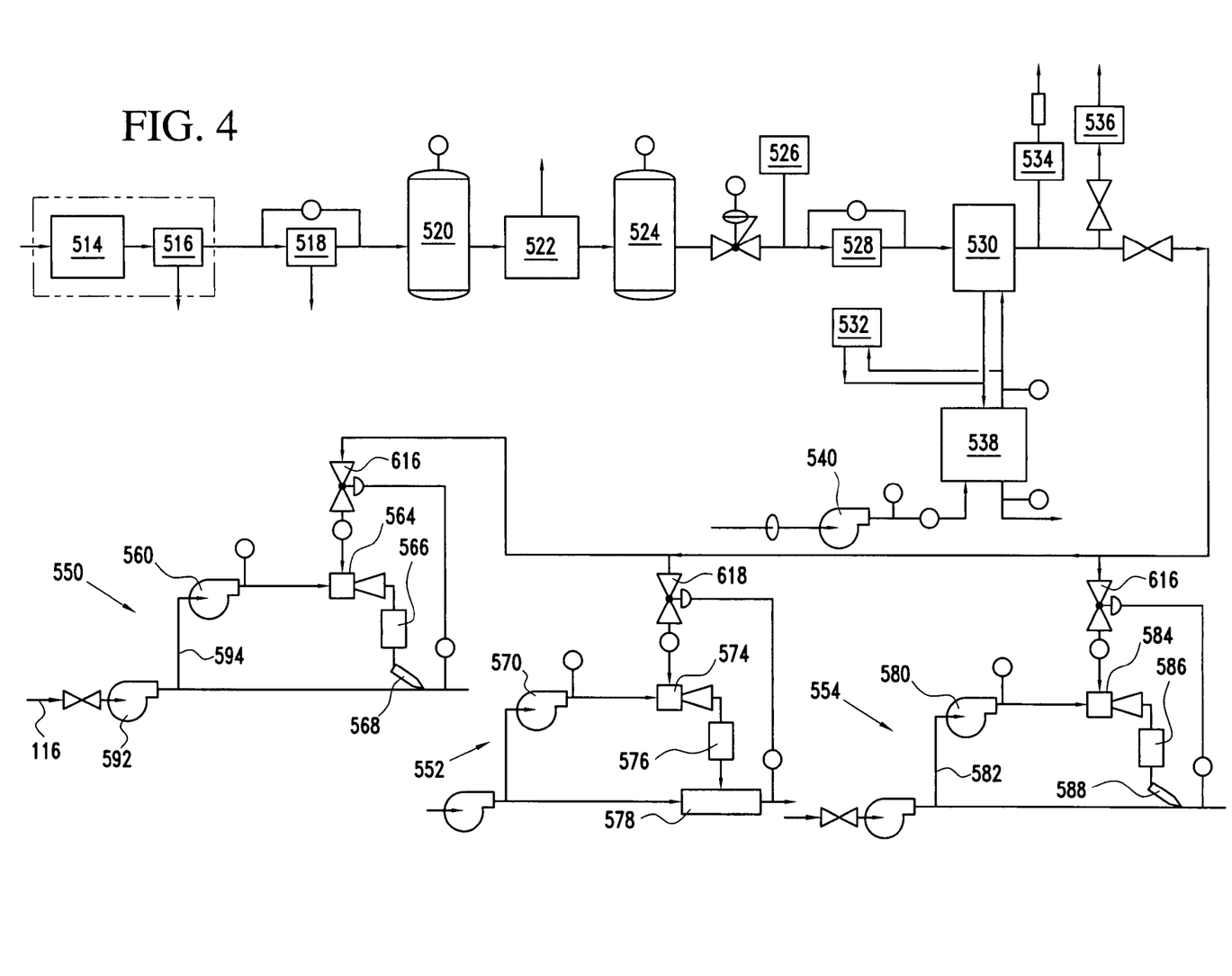
FIG. 4 is a flow diagram of a method and system for ballast water ozone injection.

FIG. 4 is a flow diagram of an embodiment of a method and system for ballast water ozone injection that can be used in conjunction with the system of vessel 10 shown in FIGS. 1 to 3. In FIG. 4, ozone generation system 502 includes air compressor 514, refrigerated air dryer 516, coalescing filter 518, air receiver 520, $O_2$ enricher 522, $O_2$ receiver 524, dew point monitor 526, filter 528, ozone generator 530, power supply 532, ozone monitor 534, ozone destruct unit 536 and chiller 538 with circulation pump 540. In operation, air is drawn into the system 502 via air intake 512. The air is compressed 514, dried and refrigerated 516, filtered 518 and temporarily stored in 520. Then according to generator demand, air is withdrawn to enricher 524, where oxygen content of the gas is increased by adsorption of nitrogen. Oxygen enriched gas is delivered to receiver 524, monitored 526 and filtered 528 until injected into ozone generator 530 operated via power supply 532. Off-gas from generator 530 is monitored 534, and destroyed 536 to prevent environment discharge. Generated ozone is stored at chiller 538 until demanded by bypass injection systems 550, 552, 554 as hereinafter described.

FIG. 4 shows three separate injection systems 550, 552, 554, which can correspond respectively to injection into aft intake conduit 116, injection into starboard intake conduit 118 and injection into port intake conduit 120. Injection system 550 includes ozone regulator 560, which can be a pump to regulate flow in the bypass 594. Further, the injection system 550 includes ozone injector 564, static mixer 566 and reinjector 568. Similarly injection system 552 includes regulator 570, ozone injector 574, static mixer 576 and reinjector 578 and injection system 554 includes regulator 580, ozone injector 584, static mixer 586 and reinjector 588. Injection systems 550, 552 and 554 are controlled respectively by controllers 610, 612 and 614. Controller 610, 612 and 614 can be a processor, computer or microprocessor or the like for regulating bypass flow and controlling injected ozone as hereinafter described.

Figure 5:
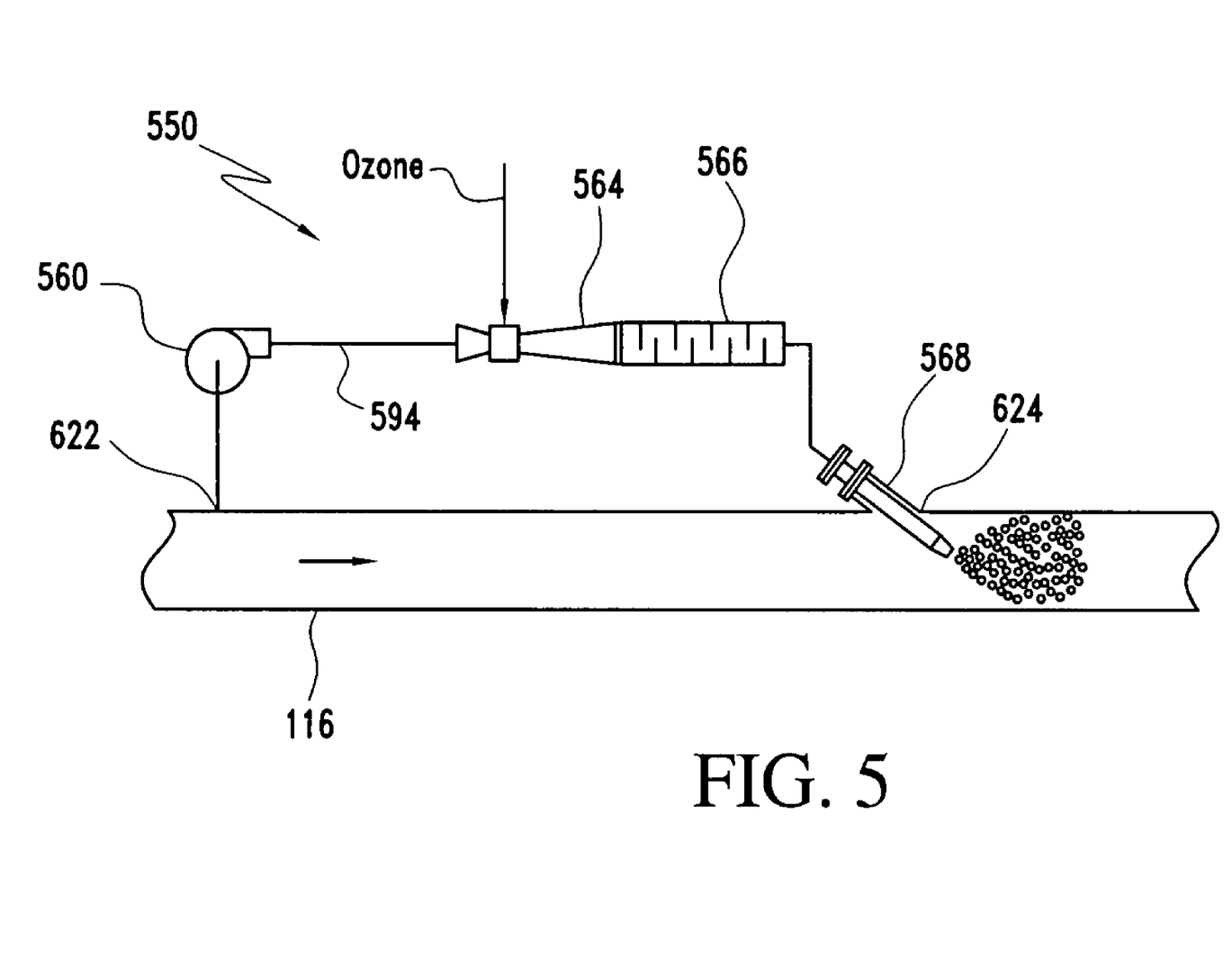
FIG. 5 is a schematic side view of a bypass conduit system.

FIG. 5 schematically shows detail of bypass injection of ozone into a diverted portion of water loading to or unloading from a ballast tank. The bypass injection allows for ozone injection, provides proper mixing and solubilization of the ozone gas into the ballast water and proper remixing of the ozonated diverted portion with the main water flow. Shown in FIG. 5 is exemplary aft load/discharge bypass injection system 550. The system 550 includes a bypass conduit 594 that diverges from main conduit 116 at an upstream point 622 and reconverges with the main conduit 116 at a downstream point 624. Bypass conduit 620 includes pump 560, venturi 564, mixer 566 and main conduit reinjector 568.

Taking system 550 as an exemplary system, operation is described as follows: Seawater from sea chest 132 (FIG. 4) is fed in conduit 116 via main ballast water pump 592 (FIG. 4) to injection system 550. A portion of the seawater is diverted by circulation pump 560 from conduit 116 into by-pass line 594. Flow of the diverted water portion is controlled by regulating the pump 560. Injector 564 injects ozone from generator 530 into the diverted seawater portion. The ozone injector 564 can be a venturi injector or the like. The injected ozone is dispersed further into the seawater portion by static mixer 566 and combined back with the main seawater in conduit 116 at mainline contactor 568.

The injector 564 can be any gas into fluid injector such as a jet injector, but preferably is a venturi to address the requirements of mixing gas into a high volume of liquid to achieve a high degree of solubility. Further, a venturi is desirable because of its very low power consumption, few moving parts, and minimal system backpressure. A venturi works by forcing a fluid through a conic constriction that initiates a pressure differential in the venturi tube between an inlet and an outlet port. The pressure differential inside the venturi tube imitates suction of another fluid (ozone containing gas in the present case) through a port of an intersecting side line.

A venturi injector can include a venturi tube that comprises a short straight pipe section or throat between two tapered sections. The tapered sections form the constriction that causes a drop in pressure as fluid flows through the pipe. The pressure drop draws ozone into the flow from the intersecting side line.

The ozone gas/water mixture can be processed through a static mixer 566 after exiting the venturi injector. Mixer 566 is a static mixer that provides additional solubilization of ozone into the water and ensures that entrained ozone gas bubbles are uniformly dispersed in the bypass conduit water. Mixer 566 can be any suitable mixer but a static mixer is preferred. Typically, a static mixer comprises a series of fins, obstructions, or channels mounted or fixed into a piping arrangement. The fins, obstructions or channels are designed to promote further mixing of the ozone gas and ballast water liquid. A static mixer may use some method of first dividing the flow, then rotating, channeling, or diverting it. The static mixer intensifies the physical and chemical processes of ozone solubilization. The intensified mixing lengthens the distance covered by gas bubbles and breaks the bubbles into still smaller bubbles thereby increasing the ability to transfer ozone from the gas mixture to the water. The mixer of the system can provide an additional 5-10% solubilization.

The static mixer 566 is selected by considering the material to be processed and the rate at which it must be processed. A static mixer with at least 12 elements or equivalent composite mixer can be used to fit a pipe of the same diameter as that exiting from the injector. In addition, allowable pressure drop must be assessed, in order to make certain that the bypass circulating pump has both flow capacity and pressure capability to provide proper mixing in the static mixer. Also, the water flow rate should be high enough to ensure a low enough contact time to minimize ozone losses to wasteful by reactions in seawater.

According to an aspect of the invention, a minimum bypass flow rate is required to provide sufficient ozonation of ballast water when the bypass is reinjected back into a main conduit. In an embodiment, a minimum bypass flow rate must be maintained of at least 0.25% of the main conduit flow for every mg/L of ozone injected into the bypass. Desirably the bypass flow rate is maintained at more than 0.30% of the main conduit flow and preferably, the flow rate is maintained at 0.35% of the main conduit flow. For example as described hereinafter for 0.33%, a flow ratio between a bypass flow and that in the main conduit flow is about 66 gal/min to 10,000 gal/min. In operation for example, controller 610 controls pump 560 to regulate water flow in coordination with ozone injection by injector 562 to effectively provide a minimum diverted portion flow rate according to flow in the conduit and proportion of ozone generated in the injected gas. Thus the controller 610 can coordinate flow by pump 560 with injector 564 to provide diverted portion flow of at least 0.25% of a main conduit flow for every mg/L of ozone injected into the bypass.

The following EXAMPLES serve as illustrations and are not intended as limitations of the present invention as defined in the claims.

EXAMPLE I

In this EXAMPLE, ballast water is fed from an intake/discharge conduit between a sea chest and a battery of ballast tanks of a 100,000 to 150,000 DWT tanker. The water is fed at a 10,000 gpm flow rate. The seawater contains 70 mg/L of bromide.

A bypass stream of water is diverted from the intake/discharge conduit at a constant flow into a bypass conduit system illustrated in FIG. 5. Ozone gas is fed under slight pressure (12-15 psi) from its generating source through 316 L stainless steel piping to a venturi injector. The ozone is injected as a 10-12% ozone in oxygen admixture. A bypass flow rate is set to permit effective injection by the venturi. In this EXAMPLE, a bypass flow rate is set at 66 gpm and pressure of approximately 90 psi. This flow rate is 0.3% of the main flow for every mg/L of ozone to be dosed (2.0 mg/L in this EXAMPLE). Flow and pressure are maintained by a positive displacement pump.

The selected flow rate and pressure are confirmed as follows: The flow ratio between the main flow and that in the bypass is about 10,000 gal/min to 66 gal/min. The specific ozone dosage in the bypass to achieve 2 mg/L in the main stream would be 303 mg/L so that with only 70 mg/L of bromide in the seawater, $OBr^-$ would exceed $Br^-$ by far, favoring the undesirable reactions. The beneficial reactions producing $OBr^-$ will only dominate once the bypass stream is remixed with the main stream. Hence, bypass retention time is minimized to avoid as much ozone loss as possible and to meet the main dosage requirement of 2.0 mg/L.

The bypass injection venturi minimizes back-pressure and provides 90-95% solubilization of ozone gas in seawater.

EXAMPLE II

In this EXAMPLE, bypass piping length for the bypass 594 is limited and a higher than typical pumping rate is maintained to reduce retention time down to almost 0.2 seconds as follows:

A bypass flow rate of 66 gpm typically requires a 2" pipe size. In this EXAMPLE, a smaller pipe size is selected to improve the flow velocity. Since back pressure on the venturi is also a limitation, the selected pipe size is decreased by only one size increment, i.e. to 1½". The cross-sectional area of a 1½" Schedule 80 pipe is 0.01227 square feet. The flow rate is $(66/(7.48\times60))=0.1471$ ft$^3$/sec, so that the velocity in the pipe is increased to $0.1471/0.01227=12$ ft/sec.

The bypass system is designed to provide a minimum length (retention length) from venturi to main conduit reinjection point as follows. The retention length is limited to a first 15 nominal diameters length to accommodate a static mixer and an additional 30 inches to accommodate an angled reinjector. The retention length for these requirements is 2.5 feet. The resulting retention time in traveling 2.5 ft at 12 ft/sec=0.21 s.

EXAMPLE III

This EXAMPLE determined concentrations of ozone to eliminate an acceptable percentage of organisms from ballast water tanks and to avoid off-gas. The toxicity of ozone gas was determined to five species of marine organisms by ozone sparging into artificial seawater (ASW) in short-term (i.e., <5 h) batch exposures.

Adult mysid shrimp, larval topsmelt, juvenile sheepshead minnows, and adult amphipods were tested. Adult *Americamysis bahia*, larval *Atherinops affinis*, juvenile *C. variegatus*, and adult *L. plumulosus* were obtained from Aquatic Biosystems (ABS, Fort Collins, Colo., USA), while adult *R. abronius* were collected in the field near Anacortes, Wash., and shipped overnight to the testing laboratory. Juvenile *Americamysis bahia* (10 d) were also received from ABS for tests concerning post ozonation exposure and the persistence of ozone byproducts. All organisms were in good condition before beginning testing.

All toxicity tests were conducted in glass aquaria (either 10 or 20 L) containing artificial seawater (ASW; Forty Fathoms Crystal Sea and deionized water) at 28-30 ppt. Prior to testing, aquaria were filled with ASW, placed in a water bath, and equilibrated overnight to test temperature. Small pieces of nylon mesh were placed as substrate in aquaria used to conduct toxicity tests with *L. plumulosus* and *R. abronius*.

Ozone was dispensed using a Model SC-10 ozone generator (Nutech O3 Inc., McLean, Va.). Total flow through the system was 2500 mL/min. Flow to each chamber was controlled with an N012-10 flow meter with a glass float (Gilmont Instruments, Barrington, Ill.). Ozone gas was distributed to the chambers using Kynar tubing and ozone tolerant diffusers (Aquatic Ecosystems).

TRO measurements were obtained using an N,N-diethyl-1,4 phenylenediammonium/potassium iodide (DPD/KI) indicator and a Pocket Colorimeter (Hach, Loveland, Colo.). This procedure was equivalent to USEPA Method 330.5 for wastewater and Standard Method 4500-Cl G for drinking water. TRO concentration (mg/L) measurements were calculated and expressed as equivalent concentrations of bromine ($Br_2$, 1 mol $Cl_2$=0.44 mol $Br_2$).

Three 20-L aquaria containing ASW at 28-30 ppt salinity were treated with ozone at a flow rate of 61.6 ml/min over a period of 24 h. A 20-L control aquarium received compressed air at the same flow rate. Similarly to methods used on the Tonsina by Cooper et al. (2002). TRO measurements were obtained from all chambers at 0.5 h intervals from 0 to 6 h.

Ozone toxicity experiments for larval *Atherinops affinis*, juvenile *C. variegatus*, and adult *R. abronius* were conducted in 20-L aquaria, while experiments with adult *Americamysis bahia* and adult *L. plumulosus* were performed in 10-L aquaria. All experiments used a total of five 108 chambers each containing ten organisms, with one chamber tested per treatment. Chambers containing all organisms except *R. abronius* (15±2 degree C.) were maintained at 23±2° C.

Total gas flow rates for 20-L chambers were 97.5, 63.2, 38.6, and 20.0 mL/min. These flow rates corresponded to nominal ozone supply rates of 0.43, 0.28, 0.17, and 0.09 mg O3/L/min. Controls received compressed, ambient air at 97.5 mL/min (i.e., maximum flow rate). Total gas flow rates for 10-L chambers were 38.6, 28.3, 20.0, and 13.1 mL/min (0.34, 0.25, 0.17, 114 and 0.11 mg O3/L/min; control air flow=38.6 mL/min). Experiments were run for a maximum of five h. TRO measurements were recorded with biological observations (mortality and motility of survivors) at 0.5-, 1-, 2-, 3-, 4-, and 5-h following test initiation. Experiments were terminated within the 5-h exposure period if all organisms in a treatment died.

To determine effects of short-term ozone exposure on longer-term survival Juvenile *Americamysis bahia* (10 d) were placed in five 20-L glass aquaria (19±2° C., ten organisms per chamber). Total gas flow rates for 20-L chambers were 97.5, 63.2, 38.6, and 20.0 mL/min (0.43, 0.28, 0.17, and 0.09 mg O3/L/min; control air flow=97.5 ml/min). TRO measurements were taken both before initiating ozone treatment and after 75 min of exposure. After 90 min of exposure, surviving organisms from each chamber were removed and placed into beakers of clean seawater maintained in a water bath at 19±2° C., and fed *Artemia franciscana* (0.1 mL per beaker). The shrimp were examined at 24 h after terminating exposure for mortality, and dead organisms were removed. Surviving organisms were again fed *Artemia franciscana*, and examined again for mortality at 48 h after exposure.

To determine toxicity of residual oxidants over time A 20-L glass aquarium containing ASW at 19° C. was treated with ozone at 97.5 ml/min (0.43 mg O3/L/min) until targeted TRO values (>4.0 mg/L) were reached (1.5 h; see results). A portion of the treated water (2.5 L) was obtained for immediate use, while the remainder was transferred from the aquarium to 20-L low-density polyethylene Cubitainers (Hedwin Corporation, Laporte, Ind.) and stored in darkness without container headspace at 12° C. Toxicity experiments were initiated with the ozone-treated water at 0, 24, and 48 h following this exposure period. A range of TRO concentrations was achieved by mixing the ozonated water with fresh ASW. Concentrations of ozonated water used in toxicity tests were 100% (ozonated water only), 75%, 50%, 25%, and 0% (ASW only). Three, 300 ml replicates of each concentration in 500 ml beakers were used for each test and maintained at 19±2° C. in a water bath. TRO was measured for each treatment concentration. Ten juvenile *Americamysis bahia* (8 d) were used in each replicate, and were fed 0.2 ml *Artemia franciscana* at test initiation. The shrimp were examined at 24 h for mortality, and dead organisms were removed. Surviving organisms were again fed *A. franciscana*, and examined again for mortality at 48 h after the beginning of the test.

Toxicity endpoints were expressed either as median-lethal concentrations (LC50) at specific exposure times ranging from 1-48 h, or as median-lethal times (LT50) as a function of ozone gas loading rates. In addition, 95%-lethal concentrations (LC95) were calculated to estimate time-specific TRO concentrations associated with nearly complete mortality. All endpoints were calculated using the Trimmed Spearman-Karber method (e.g. Hamilton et al. 1977), or by linear interpolation if acceptable trim values were exceeded. All endpoint calculations were conducted using the Comprehensive Environmental Toxicity Information System (CETIS V1.0, Tidepool Scientific Software, McKinleyville, Calif.). LC50 and LC95 values for batch ozone toxicity tests were obtained from measured TRO concentrations and the total number of mortalities observed at each time period following test initiation. LC50 and LC95 values for experiments testing the toxicity of residual oxidants over time were expressed as a function of TRO concentrations measured immediately after test initiation.

Ozonation of ASW in glass aquaria over 5 h during the acute batch toxicity tests indicated a gradual increase of TRO over time without saturation. An example plot of TRO concentrations at each ozone flow rate as a function of time for the *L. plumulosus* tests is presented in FIG. 8. At lower flow rates (0.11-0.17 mg O3/L/min), TRO concentrations reached 1.9-3.6 mg/L, whereas concentrations reached 4.6-5.6 mg TRO/L at higher flow rates. Thus, at any given exposure period, increasing ozone gas delivery rates generated increasing instantaneous TRO concentrations in ASW.

Effects of short-term ozone exposure on survival: LC50 values for all organisms ranged from 0.31 to >5.63 mg/L, with 100% mortality of each species except *L. plumulosus* occurring in less than 5 h (Table 1 of FIG. 6). The juvenile topsmelt (*Atherinops affinis*) was the most sensitive organism tested, with LC50 values of 0.38 and 0.31 mg TRO/L after only 1 and 2 h of ozone exposure, respectively. Juvenile sheepshead minnows (*C. variegatus*) were nearly as sensitive, but it took up to 4 h to reach a similar final LC50 (0.35 mg TRO/L). In contrast, all three invertebrates tested were significantly more tolerant of ozone exposure, with juvenile *Americamysis bahia* reaching a lowest LC50 of 0.62 mg TRO/L at 3 h, and adult *R. abronius* reaching a lowest LC50 of 0.94 mg TRO/L after 4 h. This same trend in relative species sensitivity was also evident at 2 h (i.e., the longest exposure period with less than 100% mortality for all species) with the two juvenile fish having the lowest LC50s (0.31 and 0.44 mg TRO/L), and the invertebrates *Americamysis bahia* and *R. abronius* exhibiting significantly higher LC50s (1.37 and 1.72 mg TRO/L, respectively; Table 1 of FIG. 6). 95%-lethal effect concentrations (LC95) were approximately two to three-fold higher than LC50 values for all species and time values testing (Table 2 of FIG. 6). No significant mortality was observed in the amphipod *L. plumulosus* at any TRO concentrations tested up to 5.63 mg TRO/L after 5 h of batch ozonation (Tables 1 and 2 of FIG. 6).

Figure 7:
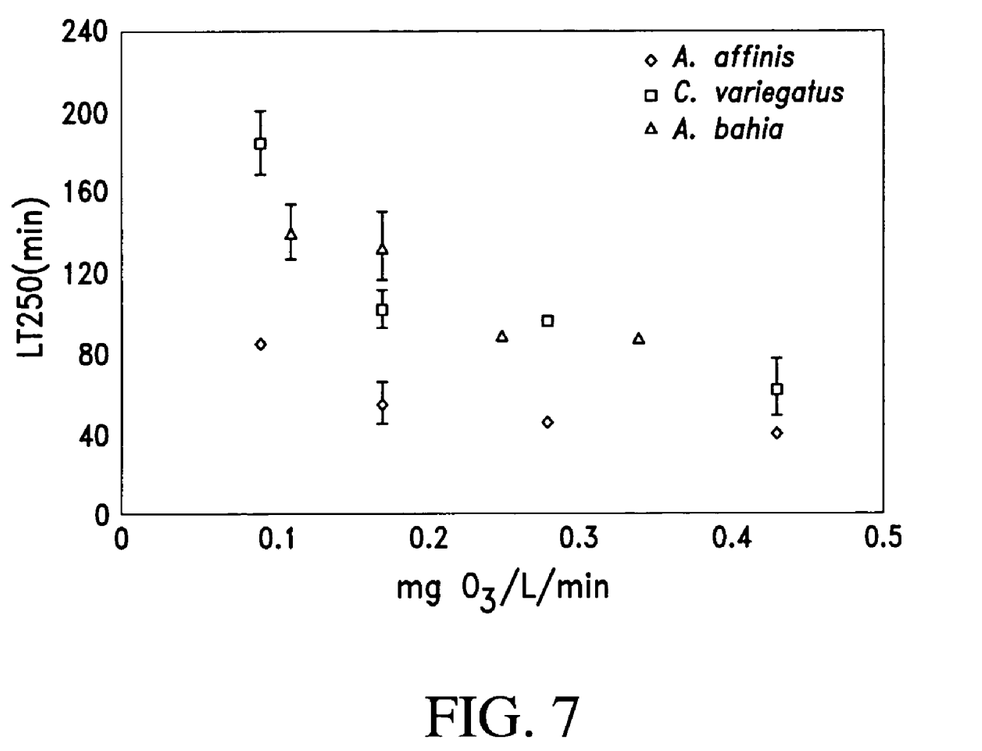
FIG. 7 shows LT50 (median-lethal times) values derived for three species.

To indicate the time needed to induce significant mortality via batch ozonation, LT50 values were derived for the three most sensitive species (FIG. 7). Similarly to the LC50 results, juvenile topsmelt (*Atherinops affinis*) were the most sensitive to ozone exposure in ASW with median lethal times ranging from 84-38 min at the lowest to highest ozone loading rates, respectively. Both the mysid shrimp (*Americamysis bahia*) and sheepshead minnows (*C. variegatus*) exhibited longer median lethal times ranging from 139-184 min at the lowest ozone loading rate to 86-60 min at the highest ozone loading rates. LT50 data could not be derived for either of the less sensitive amphipods, *R. abronius* or *L. plumulosus*.

Figure 8:
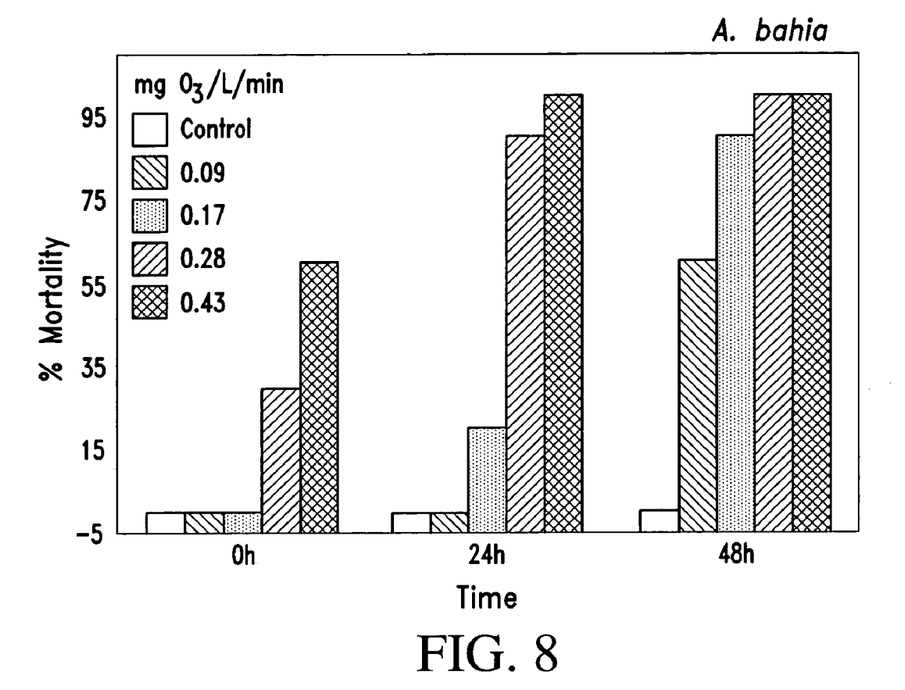
FIG. 8 is a graph of mortality at ozone loading rates.

Effects of short-term ozone exposure on longer-term survival: When juvenile mysids (*Americamysis bahia*) were removed from ozonated ASW after 1.5 h, only 30-60% mortality had occurred at the two highest ozone loading rates (FIG. 8). However, mortality continued to occur even after organisms were transferred to clean ASW. Mortality ranged from 20-100% in organisms previously exposed to the highest three ozone loading rates after 24 h, and from 60-100% in organisms previously exposed to all four ozone loading rates after 48 h.

Figure 9:
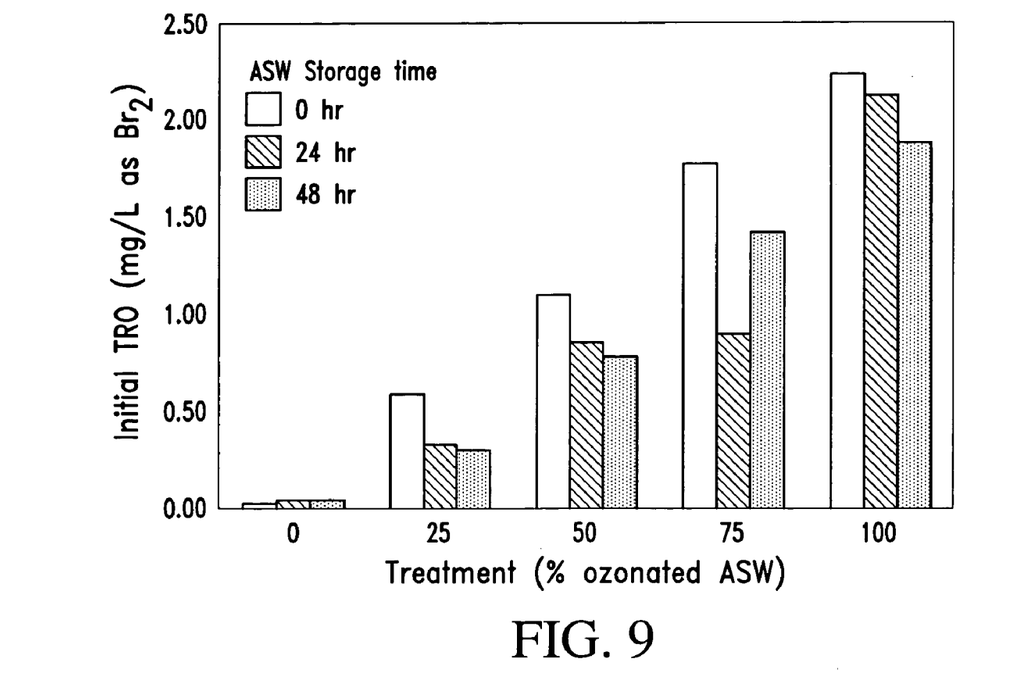
FIG. 9 is a graph showing toxicity of residual oxidants over time.

Toxicity of residual oxidants over time: After 1.5 h of ozonation at 0.43 mg O3/L/min, TRO reached 2.24 mg/L which, when diluted with clean ASW, created a dilution series ranging down to 0.59 mg TRO/L at 25% ozonated ASW (FIG. 9). Relatively little TRO loss occurred after ASW storage with a maximum concentration of 2.13 mg TRO/L at 24 h, and 1.66 mg TRO/L at 48 h. As a result, dilution series generated an acceptable range of TRO concentrations for deriving median lethal effects levels in Americamysis bahia when measured at the time of test initiation (FIG. 9).

Figure 6:
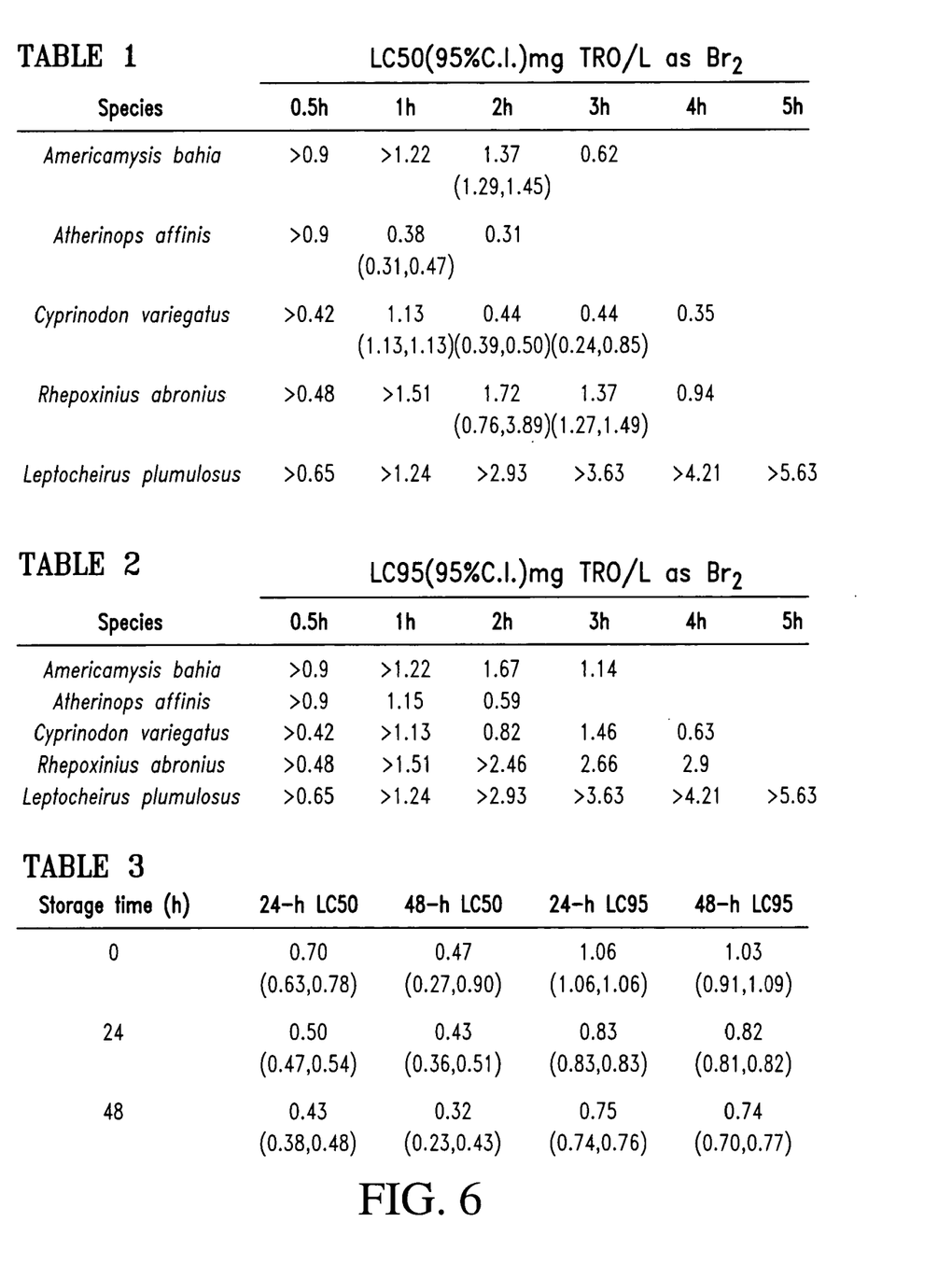
FIG. 6 is Table 1 showing effects of short-term ozone exposure on survival; Table 2 showing time value testing results; and Table 3 showing LC50 values for *Americamysis bahia*.

LC50 values for Americamysis bahia in waters tested immediately following ozone treatment were 0.70 and 0.47 mg TRO/L at 24 h and 48 h, respectively (Table 3 of FIG. 6). For both 24-h and 48-h mortality data, LC50 values tended to decline slightly with increasing storage time, but these differences were not statistically significant (i.e., 95% confidence limits all overlapped). 95% effect concentrations exhibited similar trends with 24-h LC95s ranging from 1.06-0.75 mg TRO/L, and 48-h LC95s ranging from 1.03-0.74 mg TRO/L (Table 3, FIG. 6).

Juvenile topsmelt and sheepshead minnows (Atherinops affinis and Cyprinodon variegatus) were the most sensitive to oxidant exposure, with the mysid shrimp Americamysis bahia being the most sensitive invertebrate. In contrast, benthic amphipods (Rhepoxinius abronius, and Leptochirus 6 plumulosus) were the least sensitive of all species tested. Mortality from ozone exposure occurred quickly with median lethal times ranging from 1-3 h for the most sensitive species, 8 although additional mortality can occur 1-2 d following ozonation. As shown supra, ozone does not persist in seawater under the conditions of treatment according to the invention. Hence, toxicity most likely resulted from oxidation of bromide to bromine species 10 (HOBr, OBr—) which persist and continue to induce mortality even after 1-2 d storage. Therefore, ozonating seawater in short-term batch exposures to generate TRO concentrations ranging from 12 0.3-1.7 mg/L as Br2 may effectively remove significant portions of marine NIS populations.

The results indicate that marine invertebrate and fish species can be effectively eliminated following short-term (i.e., less than 5 hours to 100% mortality) ozonation at TRO concentrations less than 1 mg/l as bromine, and that ozone-produced oxidants can accumulate and remain toxic in closed containers for at least two days. Benthic invertebrates, such as blue crabs may be relatively tolerant of ozone-produced oxidants, and so may require other control methods to prevent introductions from ballast water discharge.

This EXAMPLE shows that ozonating seawater in short-term batch exposures to generate TRO concentrations ranging from 0.3-1.7 mg/L as $Br_2$ effectively removes significant portions of marine NIS populations. Analysis of this range indicates that all oxygen is dissolved with the ozone to avert an equilibrium situation. Consuming ozone by chemical reactions in the seawater averts the release of ozone from solution when subsequently exposed to the. The system can avert equilibrium to permit a nearly total transfer of ozone to water or seawater.

While preferred embodiments of the invention have been described, the present invention is capable of variation and modification and therefore should not be limited to the precise details of the EXAMPLES. The invention includes changes and alterations that fall within the purview of the following claims.

What is claimed is:

1. A ballast-water treatment system without an off-gas destruction device; comprising:
    a salt water or fresh water sea faring vessel including at least one ballast tank and at least one conduit conveying water to or from an intake/outlet to the ballast tank;
    a regulator to divert a portion of the water from the conduit;
    an injector to provide an ozone injection rate into the portion of water; and
    a controller operatively connected to the regulator and the injector to adjust the diverted portion of water and an injection rate of the ozone into the portion to attain a target biokill while avoiding a release of detrimental gas into the atmosphere without an off-gas destruction device.

2. The ballast water treatment system of claim 1, further comprising a reinjector to reinject the diverted portion with ozone back to the water conduit at a return point; and
    a disperser to disperse injected ozone through the portion prior to recombining the portion with the water.

3. The ballast water treatment system of claim 1, further comprising an ozone generator to provide ozone to the injector.

4. The ballast water treatment system of claim 1, comprising a plurality of diverter and injector sets to inject ozone into a plurality of portions of water streams prior to charging each stream into a respective ballast tank of a plurality of ballast tanks.

5. The ballast water treatment system of claim 1, wherein the controller is a computer further comprising a computer usable medium comprising a set of instructions to operate the controller to adjust the diverted portion of water and injection rate of the ozone into the portion to attain the target biokill when the portion is recombined with the water.

6. The ballast water treatment system of claim 1, wherein the controller is a computer further comprising a set of instructions to operate the controller to coordinate flow of the diverted portion and injection of ozone to provide a target level of biokill in the water.

7. The ballast water treatment system of claim 1, wherein the controller is a computer further comprising a set of instructions to operate the controller to coordinate flow of the diverted portion and injection of ozone to provide a concentration of ozone of 1.0 to 4.5 mg/l in the water.

8. The ballast water treatment system of claim 1, wherein the controller is a computer further comprising a set of instructions to operate the controller to coordinate flow of the diverted portion and injection of ozone to provide a concentration of ozone of 1.5 to 4.0 mg/l in the water.

9. The ballast water treatment system of claim 1, wherein the controller is a computer further comprising a set of instructions to operate the controller to coordinate flow of the diverted portion and injection of ozone to provide a concentration of ozone of 2.0 to 3.0 mg/l in the water.

10. The ballast water treatment system of claim 1, wherein the controller is a computer further comprising a set of instructions to operate the controller to coordinate flow of the diverted portion and injection of ozone to provide a 95% or greater species biokill in the water.

11. A method of ozone treatment, comprising:
determining a target biokill of species for water charging into a ballast tank of a sea faring vessel;
determining an injection of ozone into the water to attain the target biokill without releasing an environmentally toxic off-gas into the atmosphere;
regulating a diverted portion of the water prior to charging the water into the ballast tank;
adjusting the regulating of the diverted portion of water and a rate of injection of ozone into the portion to attain the target biokill without release of an environmentally toxic off-gas; and
injecting ozone at the determined rate into the regulated diverted portion to attain the target biokill when the portion is recombined into the water for charging to the ballast tank without releasing an environmentally toxic off-gas into the atmosphere.

12. The method of claim 11, additionally comprising charging ozone injected water into the ballast tank.

13. The method of claim 11, additionally comprising charging ozone injected water into a plurality of ballast tanks.

14. The method of claim 11, wherein the target biokill is one microbe per cubic meter of water or less.

15. The method of claim 11, comprising adjusting the regulating of the diverted portion of water and a rate of injection of the ozone into the portion of water to provide a concentration of ozone of 1.0 to 4.5 mg/l in the water charging into the ballast tank.

16. The method of claim 11, comprising adjusting the regulating of the diverted portion of water and a rate of injection of the ozone into the portion of water to provide a concentration of ozone of 1.5 to 4.0 mg/l in the water charging into the ballast tank.

17. The method of claim 11, comprising adjusting the regulating of the diverted portion of water and a rate of injection of the ozone into the portion of water to provide a concentration of ozone of 2.0 to 3.0 mg/l in the water charging into the ballast tank.

18. The method of claim 11, comprising injecting ozone into the diverted portion at a single point prior to charging the water into the ballast tank.

19. The method of claim 11, comprising injecting ozone into a diverted portion of each of a plurality of water streams prior to charging each stream into a respective ballast tank of a plurality of ballast tanks.

20. The method of claim 11, comprising regulating the diverted portion of water prior to injecting ozone into the portion and dispersing the injected ozone in the portion prior to recombining the portion into the water for charging into the ballast tank.

* * * * *